INVENTOR.
PAUL W. BRISTOW

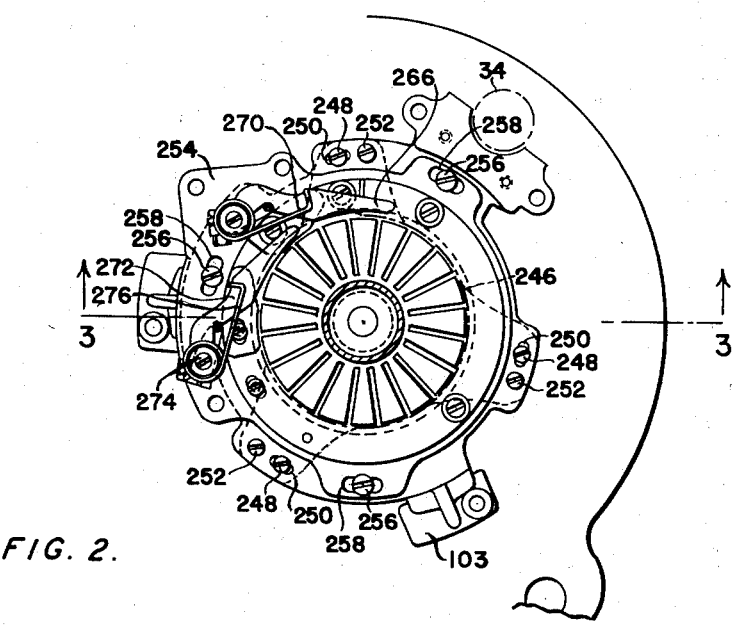
FIG. 2.
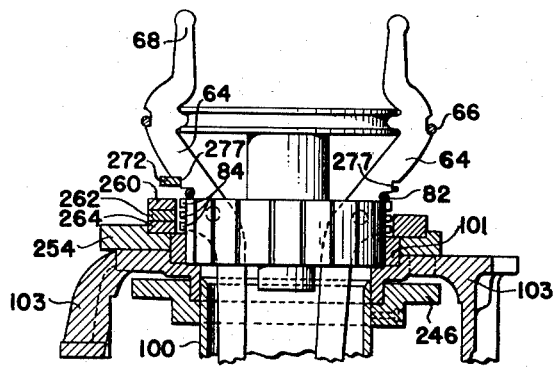
FIG. 3.
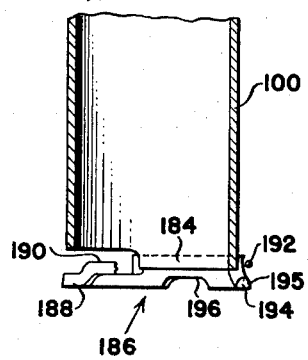
INVENTOR.
PAUL W. BRISTOW
BY
ATTORNEYS.

Oct. 2, 1951 — P. W. BRISTOW — 2,569,706
KNITTING MACHINE
Original Filed Dec. 30, 1948 — 7 Sheets-Sheet 3

INVENTOR.
PAUL W. BRISTOW
BY
ATTORNEYS.

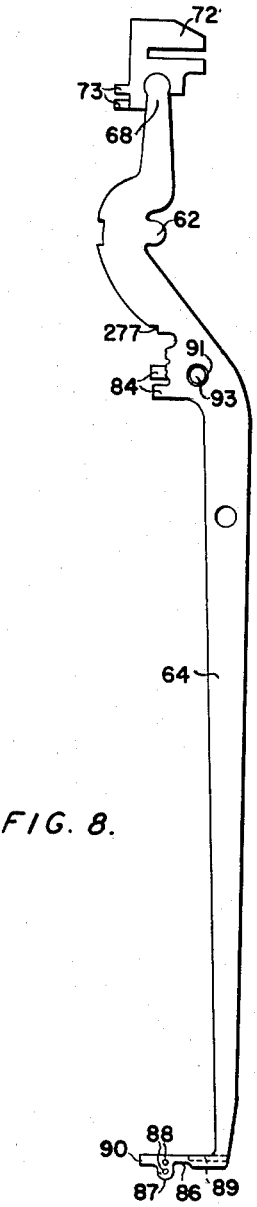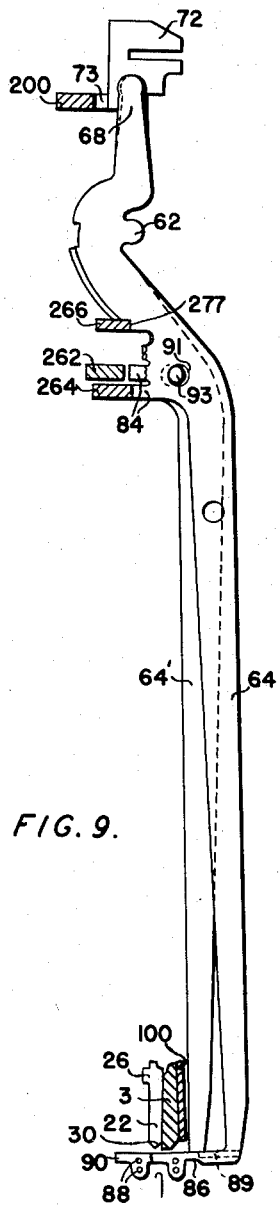

Oct. 2, 1951     P. W. BRISTOW     2,569,706
KNITTING MACHINE

Original Filed Dec. 30, 1948     7 Sheets—Sheet 5

INVENTOR.
PAUL W. BRISTOW
BY
ATTORNEYS.

Patented Oct. 2, 1951

2,569,706

UNITED STATES PATENT OFFICE 2,569,706

KNITTING MACHINE

Paul W. Bristow, Laconia, N. H., assignor to Scott & Williams, Incorporated, Laconia, N. H., a corporation of Massachusetts Original application December 30, 1948, Serial No. 68,114. Divided and this application May 17, 1950, Serial No. 162,550

6 Claims. (Cl. 66—135)

This invention relates to knitting methods and machines and has particular reference to circular knitting on machines of the superposed cylinder type involving provision for the making of wrap patterns.

This application is a division of my application Serial Number 68,114, filed December 30, 1948.

One of the objects of the present invention is to provide improved wrapping methods and devices whereby elaborate patterning may be accomplished in particular involving the production of the so-called color-in-color work. In accordance with the invention pairs of wrap yarn carriers are associated with each other for the production of multiple color designs with provision for mutual control of the wrap yarn carriers by each other resulting in simplicity of operation.

The foregoing and other objects of the invention particularly relating to details of construction and operation will become apparent from the following description read in conjunction with the accompanying drawings in which:

Figure 2 is a fragmentary plan view showing in particular the mounting arrangement for various cams acting upon wrap yarn carriers;

Figure 3 is a vertical axial section illustrating in particular the arrangement of certain cams acting upon wrap yarn carriers and the construction of a wrap horn and adjacent parts;

Figures 8 and 9 are elevations illustrating in particular the interrelationships of a pair of wrap yarn carriers, certain cams for operating these carriers being illustrated in section;

Figure 11:
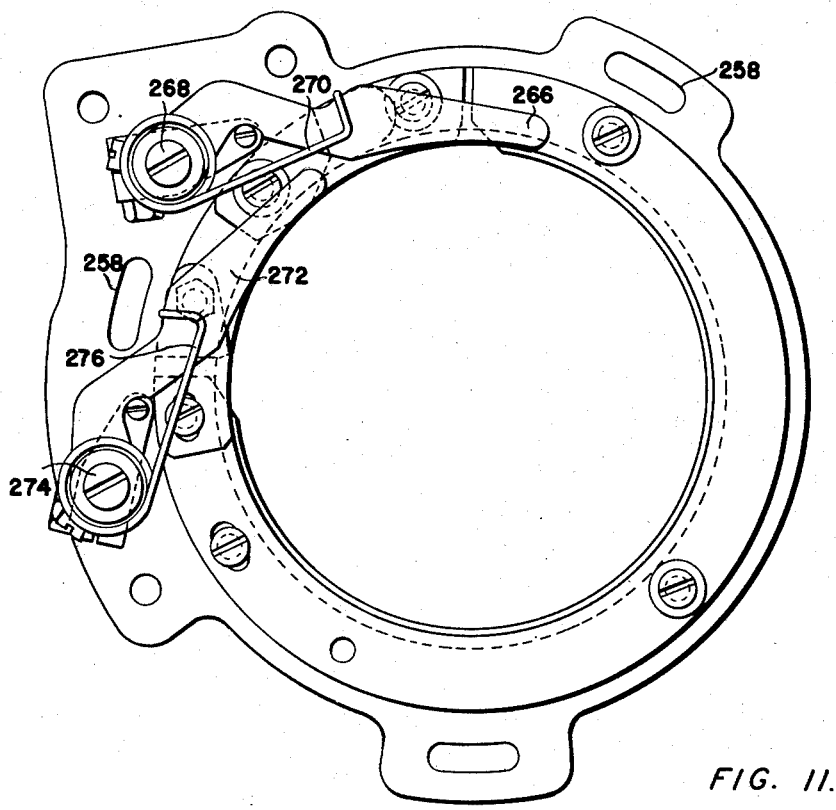
Figure 11 is a plan view showing the assembly of various cams for controlling the movements of wrap yarn carriers.
Figure 12:
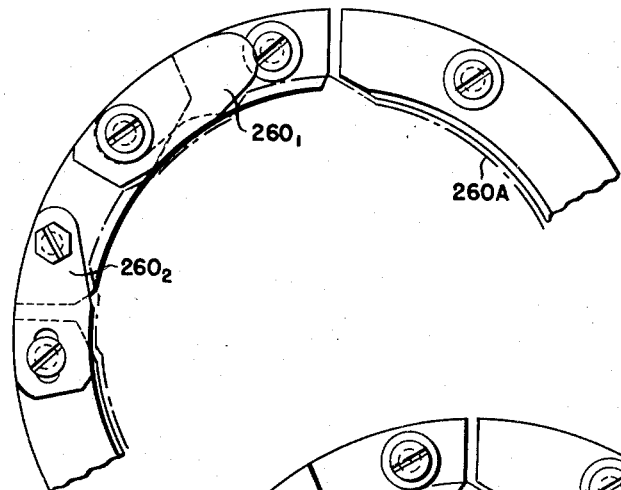
Figure 13:
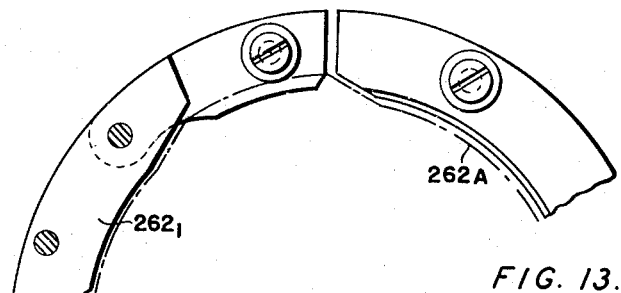
Figure 14:
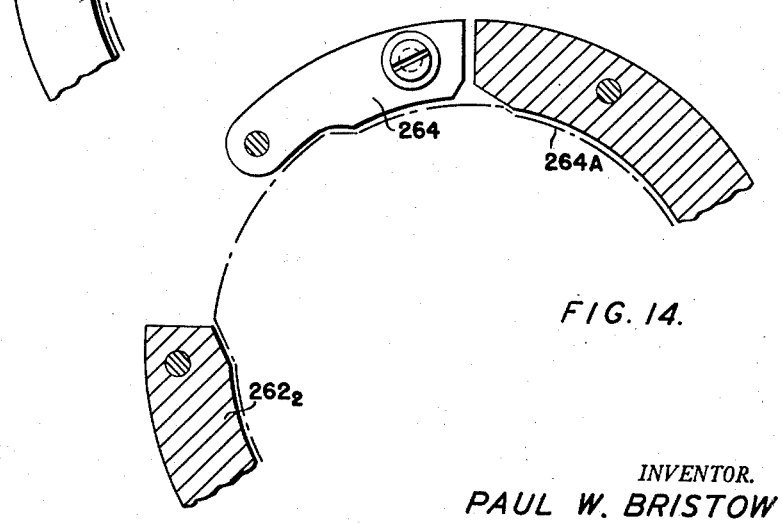
Figure 15:
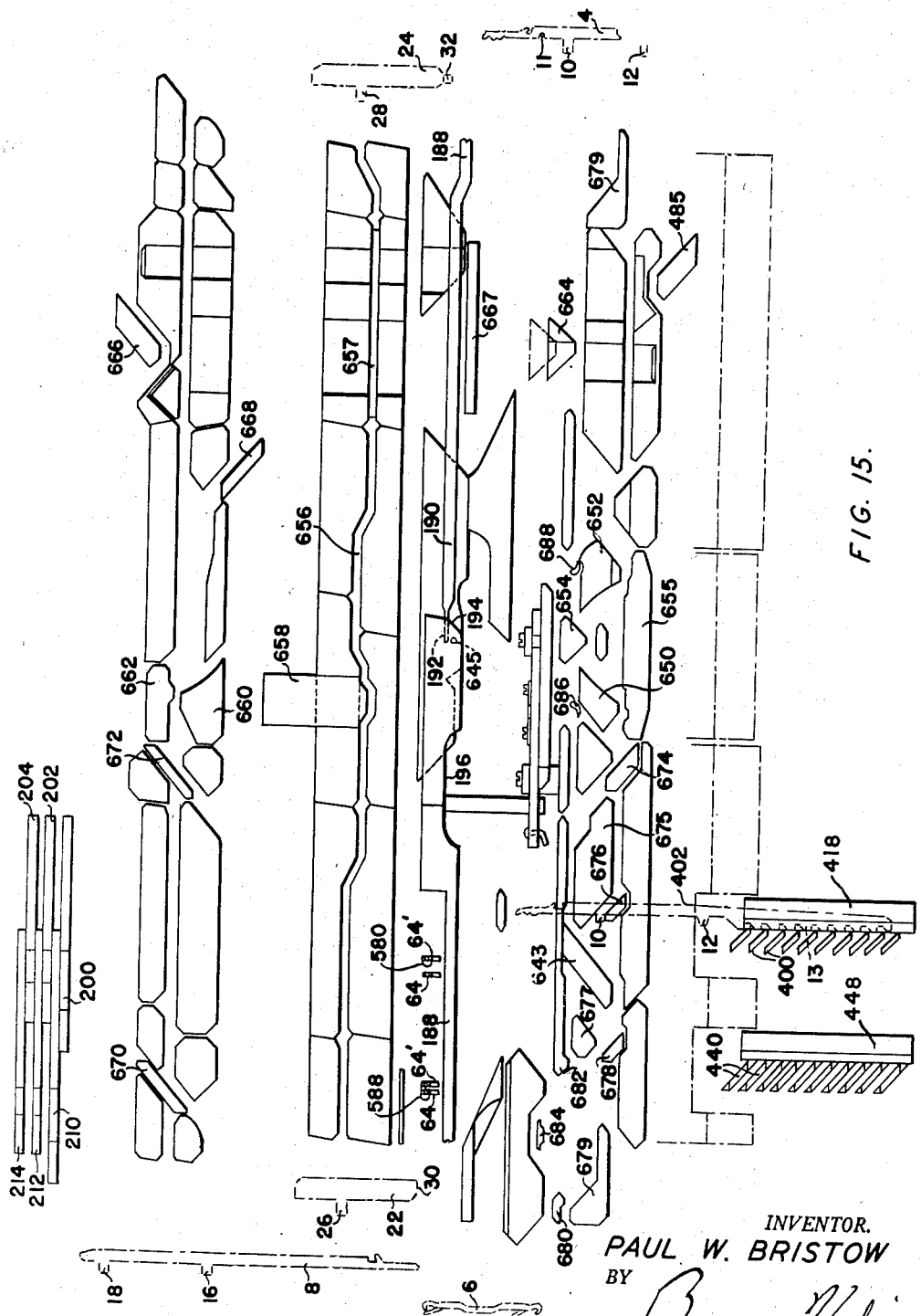

Figures 12, 13, and 14 are plan views showing the same cams as are illustrated in Figure 11 but in particular illustrating these at different levels and showing in diagram the paths of butts acted upon by the cams; and Figure 15 is an inside development of various cams for control of rotating parts of the machine, certain of these parts being indicated in construction lines.

The knitting machine embodying the inventions indicated above is of the superposed cylinder type comprising a lower cylinder 2 and an upper cylinder 3. Arranged to slide in slots in the lower cylinder are sliders 4 adapted to engage the lower hooks of double hook latch needles 6, the upper hooks of which are engageable by sliders 8 in the upper cylinder.

The lower sliders 4 are provided with butts at two levels 10 and 12 as hereafter more fully described. Some of these indicated at 402 are provided with sawtooth extensions for selection as described more fully in my application Serial Number 68,114. The upper sliders 8 are provided with butts at two levels 16 and 18. The cylinders are preferably provided with inserted fixed walls to define the slots for reception of the sliders and these walls 20 in the case of the upper cylinder terminate substantially above its lower end so that the lower portions of the slider slots are bounded not by stationary walls but by movable walls of two alternative forms arranged to slide in the wall slots in the upper cylinder. One set of these indicated at 22 carry butts 26 and are provided with outwardly and downwardly sloping lower ends as indicated most clearly at 30 in Figures 9 and 15. The other slidable walls indicated at 24 are provided with butts 28 and have verge bit extensions such as indicated at 32 in Figure 15. The arrangement and functions of these lower ends 30 and the verge bits 32 will be hereafter described. The verge bits are located between the positions of needles which, in the formation of broad ribs, are carried by sliders in the upper cylinder.

The cylinders are rotated and reciprocated in unison through the medium of a vertical shaft 34 which, through conventional gearing is driven by the lower cylinder and which, through gearing indicated at 40 and 42, drives the upper cylinder. The present machine additionally involves the driving of a wrapping assembly which action is effected through gears 44 and 46, the former being carried by the shaft 34.

Arranged to cooperate with the needles are arcuate sinkers 48 which are provided with butts 50 arranged to be acted upon by stationary cams 52 (see Figure 1) supported by a stationary cylinder 54 inside the lower rotating cylinder. This stationary cylinder 54 also supports the fabric guiding tube 56 provided with an extension 57.

Figure 1:
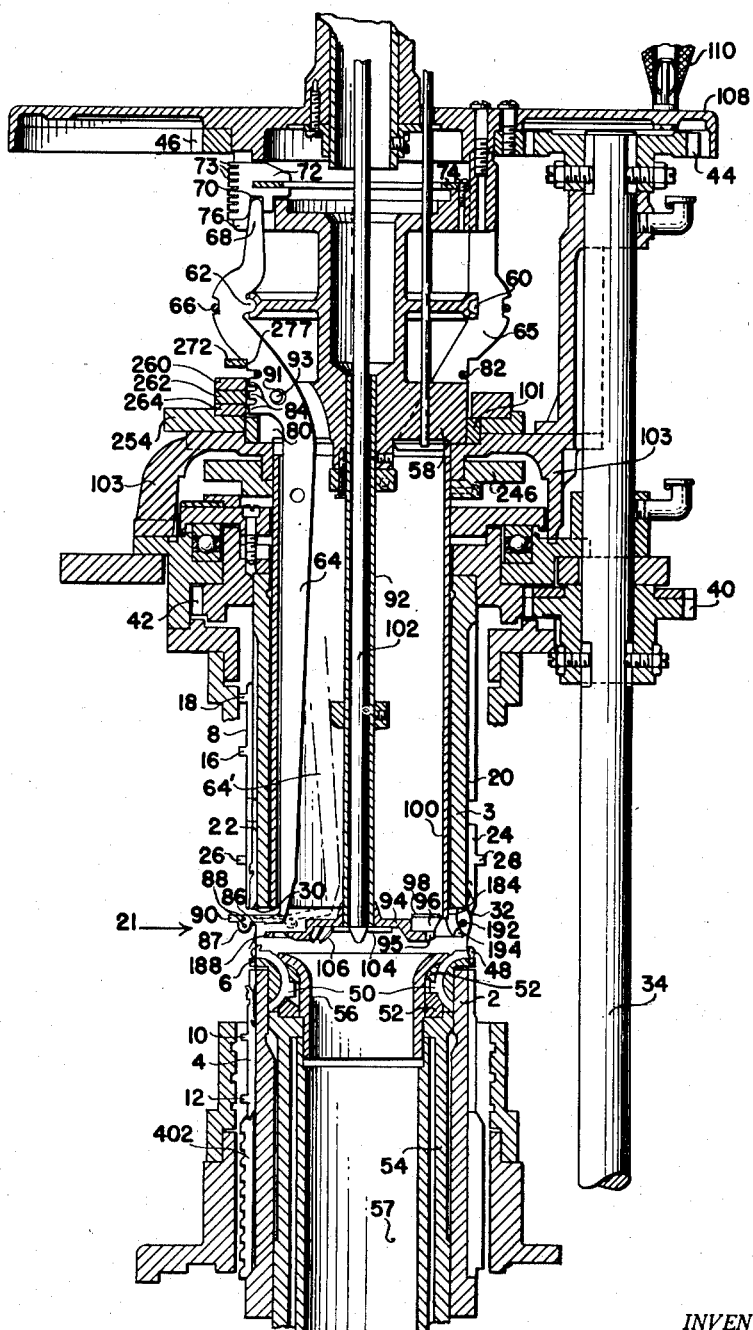
Figure 1 is a vertical axial section through the needle cylinders and the associated wrap yarn presenting mechanism of a knitting machine embodying the principles of the invention.

The rotary support for the wrap yarn carrying means is indicated generally at 58 (Figure 1). It is secured to the gear 46 and includes a member provided with an annular groove 60, in which groove are received the rounded pivot-forming projections 62 of wrap yarn carriers 64 surrounded by spring bands 66 and 82. Dummy spacers 65 are provided in locations where wrap fingers are entirely missing so as to maintain proper tension conditions of the spring bands. As will appear hereafter, in some instances two wrap yarn carriers 64 and 64' are located side by side in a single slot; if only one carrier is desired in a slot, the position of the other may be filled by a dummy carrier which is similar to an active carrier except that it terminates short of a lower yarn-carrying end. It then may function to limit movements of the active carrier associated with it, in the fashion hereafter detailed. Each of the wrap yarn carriers 64 and 64' has an upper extension 68 received in a notch 70 in an individual jack 72. These jacks 72 are provided with slots arranged so that they may embrace an annular ring 74 carried by the support 58. In order to guide the jacks 72 for radial movement and to position them in fixed circumferential locations they are received in slots 76 in the support 58. Each of the jacks is provided with a plurality of butts 73. As will be evident hereafter, these butts may be selectively broken away so as to provide selection in the operation of the wrap yarn carriers.

Each of the wrap yarn carriers 64 and 64' is provided with a downward extension extending through the upper cylinder and guided at its upper end in a radial slot 80 in the support 58. The lower spring band 82 serves to urge the lower ends of the wrap yarn carriers inwardly. Butts 84 are provided on the wrap yarn carriers to provide for the positive inward movements of their lower ends and for the arrest of the outward movements of their lower ends.

At its lower end each wrap yarn carrier is provided with a radially directed extension 86 which has a downwardly extending branch 87 provided with the yarn guiding openings 88. The downwardly extending branches 87 are provided with smooth lower inner edge portions arranged to cam the wrap yarn downwardly as the wrap yarn finger or carrier is withdrawn inwardly following a wrapping movement. Beyond these openings each carrier is provided with an abutment-engaging extension 90.

Figure 7:
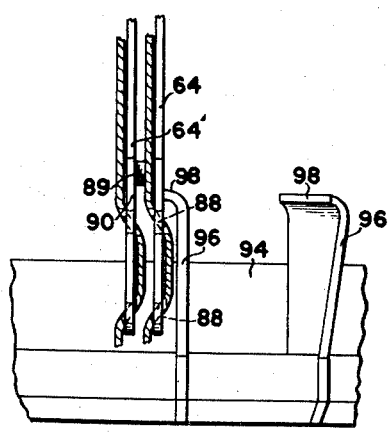
Figure 7 is a fragmentary elevation illustrating in particular the lower ends of a pair of wrap yarn carriers and means for maintaining them in their normal rest position.

The wrap yarn carriers 64 and 64' differ from each other only in the fact that the carriers 64 are provided with laterally extending ears 89 which, as is best indicated in Figure 7, cause the lower ends of two closely adjacent carriers 64 and 64' supported in the same slot 80 in the support 58 to remain spaced from each other so that the wrap yarns passing through the openings 88 are not subject to friction or snagging during the movements of the adjacent carriers relative to each other. The ears 89 are of such radial extent that during the limited relative radial movements of the adjacent wrap yarn carriers these ears are always in position to maintain the lower ends of the carriers circumferentially spaced from each other.

The wrap yarn carriers are prevented from having more than a limited radial relative movement by reason of their being provided with circular holes 91 in which, in the case of each pair of carriers, there is located a disc 93 which is of such smaller diameter than the holes 91 as will provide the desired limit of relative movement of the lower ends of the carriers, for example, in a typical case the movement is limited to about a half inch. As a result of this construction, if one of the carriers is moved outwardly the other will follow it with a definite radial lag of movement of its lower end. In similar fashion the outward movement of one carrier of a pair may be limited by interruption of the outward movement of the other. As will become evident hereafter this interrelationship imposed on the carriers is used in the control thereof. The thickness of each disc 93 is approximately double the thickness of the wrap yarn carriers and slightly less than the clearance provided by the slot 80 so that these discs float in the openings 91 and in the slots 80 without any possibility of being disengaged from either of the pair of associated wrap yarn carriers. A similar disc arrangement is provided in the case of an active wrap yarn carrier associated with a dummy carrier, outward movements of the active carrier being restrained by the dummy carrier through their common disc 93 when outward movement of the dummy carrier is limited by a cam. The interdependence of the movable carriers will be clear from Figures 8 and 9 to which more detailed reference will be made hereafter.

A tube 92, the upper end of which is secured in the assembly 58, carries at its lower end a disc 94 which is provided with radial fins 96, the upper edges of which are turned, as indicated at 98, in a clockwise direction as viewed in plan (see Figure 7). These edges 98 provide rests for the purpose of definitely positioning the lower ends of the wrap yarn carriers which are flexed in a counterclockwise direction as viewed in plan in order to insure normal engagement with these edges. The disc 94 is notched as indicated at 95 in the sole section thereof between the fins 96 for the free passage of wrap yarns which extend in a stocking from a point of interrupted wrapping above the heel, past the heel and other regions where wrapping does not occur. The wrap yarns then lie sufficiently inwardly not to interfere with other operations.

Extending downwardly within the upper cylinder 3 is a stationary cylinder 100, this being interposed between the cylinder 3 and the wrap yarn carriers. The cylinder 100 is carried by a portion of the frame which supplies a lower bearing 101 for the rotating support 58. The specific mounting of this cylinder is later described.

An axially extending rod 102 is guided for lengthwise movement through the tube 92 and carries at its lower end a fabric take-up disc or pusher 104 provided with rounded fingers 106.

The rotating wrap yarn carrying assembly includes a disc 108 on which are supported the wrap yarn bobbins 110, of which there is one for each wrap yarn, only one of these being illustrated in the interest of clarity in Figure 1. The wrap yarns pass from these bobbins through tension and take-up devices which are of the type disclosed in the patent to Albert L. Oberholtzer, No. 2,506,968, dated May 9, 1950.

The wrap yarn supporting means is so arranged as to permit the entire wrap yarn assembly to be raised clear of the upper cylinder and swung to one side to permit threading or other manipulations of the wrap yarn carriers. This is shown in detail in my application Serial Number 68,114, wherein there is also shown the means for controlling rod 102.

The lower end of the stationary cylinder 100 carries through an extension 184 a wrap horn indicated generally at 186 which at its initial end is in the form of a horizontal strip 188 and which beyond the region of presentation of wrap yarns to the needles has a raised extension 190 which insures a high position of the wrap yarns on the needles as they are raised following wrapping. The trailing end of this horn terminates as a wire 192 which overlaps the sloping end 194 of the wrap horn with clearance in the region of the downwardly and outwardly sloping rounded face 195 of this portion of the wrap horn. The lower edge of the wrap horn is relieved at 196 for a purpose hereafter pointed out.

Figures 4, 5:
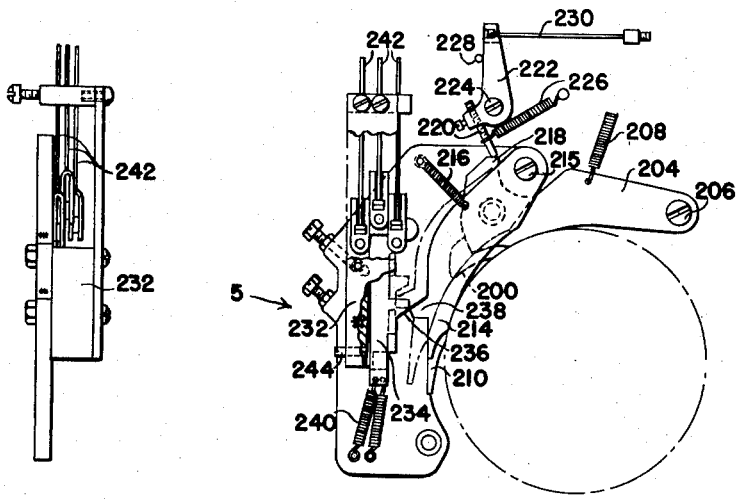
Figure 4 is a fragmentary plan view partly in section showing in particular cams for controlling outward movements of wrap yarn carriers and the controls for these cams.
Figure 5 is an elevation looking in the direction of the arrow marked 5 in Figure 4.
Figure 6:
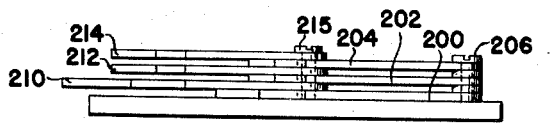
Figure 6 is a developed inside elevation of various cams illustrated in Figure 4.

Referring now to Figures 4, 5 and 6 there may be described those cams which, by acting upon the butts 73 of the jacks 72, serve to project the wrap yarn carriers across the needle circle. These cams comprise cams 200, 202 and 204 which operate at the first wrap position and cams 210, 212 and 214 which operate at the second wrap position. The cams 200, 202 and 204 are pivoted on a common stud 206 and are urged outwardly by individual springs 208. The cams 210, 212 and 214 are pivoted on a common stud 215 and are urged outwardly by individual springs 216. Each of the cams 200, 202 and 204 is provided with a back portion 218. Individual operators are provided for each of these cams which are identical so that one only need be described. This comprises an adjustable screw 220 carried by a lever 222 pivoted on a stud 224 and urged in a counterclockwise direction as viewed in plan by a spring 226 against a stop pin 228. A Bowden wire 230 connected to an individual push rod serves to move the lever 222 in a clockwise direction with the result that when no cam on the main cam drum acts on a push rod the screw 220 engaging a high part of the portion 218 of the corresponding cam will hold the cam in its innermost active position. When the push rod is raised by a cam on the main cam drum the screw 220 moves toward the left in Figure 4 and so releases the corresponding cam to render it inactive. The cams are thus rendered individually controllable through their corresponding push rods and Bowden wires.

The cams at the second wrap position are also individually controlled by a somewhat different mechanism. A housing 232 is provided to mount a series of slides 234 each of which is provided with a projection 236 cooperating with a projection 238 on the corresponding cam of this second group. The slides are normally urged downwardly as viewed in Figure 4 by individual springs 240 and are adapted to be pulled against the action of these springs by individual Bowden wires 242 connecting to corresponding plungers acted upon by cams on the main cam drum. When any plunger is not acted upon by its cam its slide will be retracted by its spring 240 and the corresponding cam will be held in operative position. When drum cams act on a plunger its slide will be pulled to a position to permit withdrawal of its cam by its spring 240 to an inoperative position. Individual screws 244 serve to adjust the slides 234 in a direction toward or from the axis of the needle cylinders so as to provide adjustment of the operative positions of the cams.

Reference may now be made to Figures 2 and 3 for the assembly which includes the cams 260, 262 and 264 which, by action on the butts 84 of the wrap yarn carriers, serve to move them inwardly of the needle circle and, as will be pointed out hereafter, also serve to limit the outward movements of the wrap yarn carriers. The main supporting bracket 103 which mounts the bearing 101 for the rotating supporting head of the wrap yarn carriers serves for the mounting of a member 246 which supports the tube 100 for accurate positioning as to its angular circumferential position, as to its height, and also as to its tilt relationship to the axis of the needle cylinders. To achieve this screws 248 pass through circumferentially extending slots 250 in the bracket 103 and are threaded into the member 246. Other screws 252 are threaded into tapped openings in the bracket 103 and their lower ends bear upon the upper surface of the member 246. As will be evident, this arrangement of the screws permits substantially universal adjustment, within limits, of the position of the member 246 and the tube 100 which it carries, the screws being tightened when the tube 100 is in properly adjusted position. This adjustment is rather critical and is for the purpose of insuring proper relationship to the needles of the wrap horn carried at the lower end of the tube 100.

Secured to the upper surface of the bracket 103 by screws 256 is a plate 254, through circumferential slots 258 in which the screws extend. This plate 254 serves as a mounting for the cams 200, 202, 204 and 210, 212 and 214 previously described, and their operating elements, and also for the cams 260, 262 and 264. Additionally supported by this plate are a pair of yield cams 266 and 272. The first of these is pivoted at 268 and urged in a clockwise direction as viewed in Figures 2 and 11 by a spring 270, while the second is pivoted at 274 and is urged clockwise by a spring 276.

At this point there may be described with reference to Figures 8 to 14, inclusive, as well as to Figures 2 to 6, inclusive, the details of operation of the wrap yarn carriers involved in the production of wrapping. A typical arrangement of the butts 73 of the jacks 72 and of the butts 84 of the wrap yarn carriers, and the various cams which operate on these butts, will be described. As will be evident, the arrangements about to be described are subject to rather arbitrary choice but to provide consistent detailed description a particular arrangement is ilustrated and described.

From Figure 1 it will be noted that there are provided eight levels of butts 73 on the jacks 72. On the present machine only the six lower levels are used, the two uppermost levels being provided for more elaborate or special patterning in which case there would be added two more cams to the set of six illustrated in Figure 6.

Figure 10:
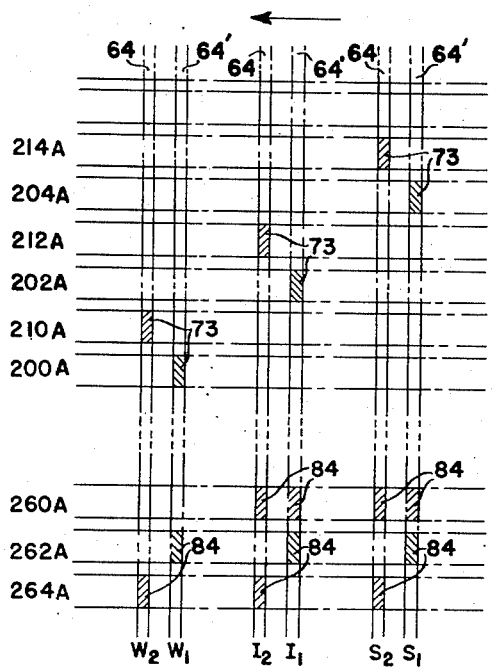
Figure 10 is a diagram showing a typical arrangement of butts for the control of wrap yarn carriers.

Referring now to Figure 10, there are diagrammed therein six typical wrap yarn carriers which are associated in pairs, the members of each pair being of the types 64 and 64' previously referred to mounted in a common slot 80 and associated with a common disc 93 whereby the carriers of the pair are limited in their relative movements. In the diagram of Figure 10 it is assumed that the wrap yarn carriers are moving toward the left past the controlling cams, this movement corresponding to a counterclockwise rotation of the needle cylinders and the wrap yarn assembly. The wrap yarn carrier $W_1$ is of the type 64' and is arranged to wrap wide panels at the first wrap position while the carrier $W_2$ is of the type 64 and is arranged to wrap wide panels at the second wrap position. The carrier $I_1$ of the type 64' is arranged to wrap narrow panels at the first wrap position on needles of the instep series while the carrier $I_2$ is arranged to wrap narrow panels at the second wrap position on needles of the instep series. The carrier $S_1$ is arranged to wrap narrow panels at the first wrap position on needles of the sole series and the carrier $S_2$ is arranged to wrap narrow panels at the second wrap position on needles of the sole series. The butts 73 of the jacks corresponding to these carriers are shaded and are indicated at levels designated by numerals corresponding to the cams shown in Figure 6 followed by the letter A. As will be noted from Figure 6, the cams 200 and 210, which from Figure 10 will be seen to act upon the butts 73 corresponding to those carriers which wrap wide panels, are somewhat longer than the other projecting cams of the groups acting on butts 73. They serve to hold outwardly the wide wrapping carriers through a greater angular extent of movement of the needles than is the case of the other cams which cooperate with the carriers wrapping narrow panels.

The butts 84 of the wrap yarn carriers are arranged as in the lower portion of Figure 10, the levels of which are designated by numerals corresponding to the return cams 260, 262 and 264 followed by the letter A. Each of the wrap yarn carriers $W_1$ has a single butt at the level 262A while each of the wrap yarn carriers $W_2$ has a single butt at the level 264A. Each of the wrap yarn carriers of the type $I_1$ or $S_1$ has a pair of butts 84 at the levels 260A and 262A. Each of the wrap yarn carriers of the type $I_2$ or $S_2$ has a pair of butts 84 at the levels 260A and 264A.

Referring now to Figures 11 to 14, inclusive, the first of these illustrates the various cams viewed from a level above the yield cams 266 and 272 which are at a common level to act upon shoulders 277 of the wrap yarn carriers. Figure 12 is viewed from a level below the yield cams but above the cams $260_1$ and $260_2$ which collectively constitute the cam generally designated heretofore as 260. Figure 13 is viewed from a level below the cams 260 but above the cams $262_1$ and $262_2$ which collectively constitute the cams 262 previously described. Figure 14 is viewed from still another level below the cam $262_1$ and illustrates the cams 264, cams $262_2$ being also active at this level and shown in section.

Reference will first be made to the sequence of operations involved in wrapping by means of the wrap yarn carriers $W_1$ and $W_2$ to wrap wide panels. As they approach the first wrap position the butt 84 of a wrap yarn carrier $W_1$ moving at the level 262A will be engaged by the cam $262_2$ with the result that the carrier $W_1$ will be in its extreme inner position. At the same time the butt 84 of carrier $W_2$ moving at the level 264A will be engaged by the cam $262_2$ so that this carrier will also be in its extreme inner position. The paths of the butts just mentioned are indicated in Figures 13 and 14, respectively, at 262A and 264A, these paths being indicated as slightly inward of the actual paths of the outer edges of the butts for clarity of illustration.

As the first wrap position is approached the cam 200 acts upon the jack butt 73 of the carrier $W_1$ which is located at the level 200A. This cam will serve to rock outwardly the lower end of carrier $W_1$, the outward movement being restrained by the action of the yield cam 266 on the shoulder 277 of this carrier. As will be noted from Figure 13, the continuity of the cams at the level 262A is interrupted at the first wrap position so that no cam at this level will restrict the outward movement of the lower end of the carrier $W_1$. However, at the level 264A there is provided the cam 264 at the first wrap position which will limit the outward movement of the butt 84 of the carrier $W_2$ associated with $W_1$. Since the outward movement of the carrier $W_2$ is thus limited the outward movement of the carrier $W_1$ will also be limited by reason of the presence of the disc 93 projecting through the holes in the two carriers. The adjustment of the cam 200 is such, of course, as to avoid undue strain in attempting to force the carrier $W_1$ outwardly beyond its limited position. The construction, however, is such that the position of the lower end of carrier $W_1$ is definitely determined, overthrow being positively limited by the action of the cam 264. Immediately after the wrap yarn carrier $W_1$ is fully projected outwardly it will be engaged by the abutment 580, hereafter described, at the first wrap point and will be retarded to effect its movement relative to the needles to produce wrapping of its wrap yarn about those needles which have been selected upwardly for wrapping.

When the butt 84 of carrier $W_1$ approaches the cam $262_1$ its jack butt 73 will be released by the cam 200 and the action of the cam $262_1$ will move the lower end of the carrier $W_1$ inwardly as indicated in Figure 13. It may be noted that the innermost position of the edge of the cam $262_1$ is not as far inwardly as the active edge of the cam $262_2$.

As the butt 84 of the carrier $W_2$ moving at the level 264A clears the end of the cam 264 the cam 210 will act upon the butt 73 of the jack associated with the carrier $W_2$ and will project the lower end of this carrier outwardly, the outward movement being restrained by the yield cam 272 acting on the shoulder 277 of the carrier $W_2$. The outward movement of this carrier $W_2$ is also limited, in this case by the limit of the outward movement of the butt 84 of the carrier $W_1$ by the cam $262_1$, the restraint being effected through the interconnection of the two carriers by their common disc 93. When the carrier $W_2$ is fully projected it will engage the abutment 588 at the second wrap point and will be restrained so that it will move relatively to the needles which have been selected upwardly for wrapping at this second wrap point. Its wrap yarn will be thereby introduced to the needles to effect a wrapping operation.

The next event involving carriers $W_1$ and $W_2$ is their complete inward return movement effected by the action of the cam $262_2$, following release of the carrier $W_2$ by the cam 210.

In summary of the above it will be noted that the two associated carriers are successively moved outwardly with restraint of each being effected by the action of a cam on the other and that in the case of these carriers the outer position is of long duration as determined by the elongated forms of the cams 200 and 210 and delay of return actions by the cams $262_1$ and $262_2$.

The controlling actions of these carriers designed to wrap short panels, i. e., the carriers $I_1$, $I_2$, $S_1$ and $S_2$, are quite similar except that, as will be evident from Figure 12, the return actions are now controlled by the cams $260_1$ and $260_2$ acting upon the butts 84 which move at the level 260A their paths being correspondingly designated in Figure 12. The returns of the wrap fingers are accelerated and these accelerated returns are permitted by the shorter lengths of the cams 202, 204, 212 and 214. The paths involved will be evident from Figure 12. It will be clear that the projection of the lower ends of these wrap yarn carriers will be restrained by the yield cams 266 and 272 and will be limited by the actions of the cams 264 and $262_1$ as in the case of the previous description of the operation of the carriers for wrapping wide panels.

As will be evident, while the foregoing description has implied wrapping by both associated carriers of a pair it will be evident that one or the other need not wrap and, of course, need not carry a wrap yarn. However, both carriers enter into the control of each since the inactive carrier is arranged to limit the outward movement of the active carrier. If a carrier is to be inactive it may be replaced by a dummy carrier essentially the same as an active carrier so far as its butt arrangement is concerned but differing therefrom in having its lower extended portion removed. These dummy carriers which cooperate in limiting the outward movements of active carriers should, of course, be distinguished from a dummy spacer such as 65 which serves no purpose except that of maintaining proper tension on the spring bands 66 and 82.

The general operation of the machine may be best described with particular reference to Figure 15 which illustrates the various cams for controlling the rotating instrumentalities. Some of these correspond generally in their construction and functions to cams commonly provided in this general type of machine. 485 is the lower transfer bolt cam. The press-off bolt cam is 643. The lower cylinder forward stitch cam 650 is mounted in usual fashion for radial adjustment and also together with reverse stitch cam 652 and the lower cam 655 for axial adjustment to control the lengths of stitches drawn by needles operating in the lower cylinder. With these cams there is associated the center cam 654.

The race 656 is followed by the butts 26 and 28 of the sliding walls 22 and 24. At 657 this race acts on the outer edges of the butts 26 and 28 to prevent the sliding walls from being pulled out as the sliders are tilted during transfer actions. The cam 658 is adapted to be moved upwardly during knitting of heels and toes to avoid straining stitches which were drawn in the upper cylinder.

The upper cylinder stitch cam 660 and associated cam 662 are axially adjustable for control of stitch length. Cams 666, 668, 670, 672, 485, 650, 674, 643, 676 and 678 are radially adjustable and have functions which will be hereafter described. A switch cam 664 is axially movable to restore needles to clearing level after the formation of heels and toes. Cams 680 and 682 are provided to act on butts of sliders at clearing level to provide space for the location of the picker 684 when it is held down temporarily as will be mentioned hereafter. The usual raising pickers are provided at 686 and 688.

The operation of the machine may be best started with consideration of the formation of looper's rounds which constitute the completion of a stocking after the formation of its toe. In this operation all the needles are carried by lower cylinder sliders and the sliders are rotating so as to carry the various elements through the cams from the right to the left to Figure 15. The transfer bolt cam 666 and the welt bolt cam 672 are inactive in the upper cylinder cam section causing the sliders in the upper cylinder to follow a normal knitting race. In the lower cylinder cam section the run down or forward stitch cam 650 is in action and the welt bolt cam 678 is also in action so that all of the needles knit plain stitches in the lower cylinder drawing yarn from a yarn feed finger in the position 645. It will, of course, be clear that as is conventional this machine is provided with a plurality of yarn feeding fingers acting at a single feed point, which fingers may be selectively brought into and taken out of action to provide desired main yarn changes.

Following the formation of the looper's round transfer of alternate needles to the upper cylinder is accomplished in conventional fashion by the action on suitable long and medium transfer butts of the lower cylinder sliders by the lower transfer cam 485. The division of needles thus provided effects the knitting of 1 x 1 rib fabric.

After the transfer to the 1 x 1 condition of the needles the welt is made for the press-off draw thread locking courses. The upper welt bolt cam 670 is stepped out, as the long butts are passing to clear short butts, and as the short butts are passing it is pulled all the way out, leaving the upper cylinder sliders in the welt race at constant level with their knitting butts passing over the top of the stitch cam 660. In the meantime the alternate needles carried by the lower cylinder sliders continue to knit plain fabric. After about three and one half such courses of knitting a change is made to produce the loose or pull courses for the press-off draw thread.

To effect this result the upper welt bolt cam 670 is stepped back into action, first against the short butts as they are passing and then fully inwardly as the long butts pass this cam, to resume 1 x 1 rib knitting on the needles engaged by the upper cylinder sliders. The clearing bolt cam 674 and the press-off bolt cam 643 are now additionally brought into action to act on the lower cylinder sliders. Concurrently with the bringing into action of the cam 643 a latch opener and needle leveler blade (not illustrated herein, but shown in the parent application) are moved into action. The latch opening occurs as the needles rise over the bolt cam 678. While the needles carried by both top and bottom cylinder sliders now draw yarn at the main yarn feed the lower cylinder sliders pass down the stitch cam 650 but then rise over the cam 674 and cam 675 to clear their stitches, shedding the stitches as they pass under the press-off bolt cam 643, leaving only the rib needles with loops. The fabric take-up plus the toe pocket weight elongates the rib loops by pulling the extra length of yarn drawn by the needles controlled by the lower cylinder sliders.

After, for example, three and one half courses of the foregoing the cams 670, 674 and 643 are stepped out and welt knitting is resumed in the fashion previously described. When sufficient welt courses are formed the bolt cam 670 is again stepped into action and the knitting of 1 x 1 rib fabric is resumed.

When enough fabric has been knitted for the formation of a desired 1 x 1 rib top the transfer cams 485 and 666 are introduced to act on the transfer butts of the sliders in the usual way to change from a 1 x 1 set up of the needles to the desired set up or distribution of the needles for production of the desired broad rib structure of the leg of the stocking. This, for example, may involve a 7 x 3 arrangement with a plain panel on each side, for example, seventeen needles wide, in which there may be wrapped a two-color clock.

In the knitting of the leg cams 668 and 670 are in action while 672 is out of action with the result that the needles which are controlled by sliders in the upper cylinder take yarn from the main yarn finger at 645 and knit rib stitches. In connection with the lower cylinder the only radially movable cams which are in action are 650, 676 and 678. The cams 676 and 678 serve to level the saw tooth sliders for selection by the cams 400 and 440 under control of trick wheels as described in my application Serial Number 68,114, the controls being now set to cause selection of these cams by the trick wheels. Cams 418 and 448 insure the alignment of the saw tooth butts of the sliders 402 so as to be properly engaged by the selecting cams. The selecting cams acting on the saw tooth butts raise the needles at the respective first and second wrap positions to present them at a level for the reception of the wrap yarns which are caused to move relatively to the needles by the abutments 580 and 588 in the fashion described in detail in my application Serial Number 68,114. The wrap yarns are, of course, presented over the horn 188, the wrap yarns being raised by the rise in this horn at 190 and being finally shed over the wire extension at 192. The knitting butts of the lower sliders follow a path over the reverse stitch cam 652, down the center cam 654 and the forward stitch cam 650, are then raised slightly by cam 676 for alignment with the saw tooth selecting cams and whether they are raised or not by these are depressed by cam 677 to rise again over the cam 678 to effect alignment with the saw tooth selecting cams 440 for the second wrapped portion. The knitting butts then rise over the cam 679 to repeat the cycle.

The relation of movement of the needles selected for wrap by cams 400 and the movement of wrap yarn fingers is quite critical. Since the needles are floating, so to speak, in the slider hooks, it is vital that the needles rise high enough to turn their latches safely and insure the wrap yarn catching or passing below the needle hooks but not high enough to prevent the wrap finger from passing over the top of the needles after the finger is projected its full distance. Also the first wrap needle of the panel must be raised all the way up by a cam 400 before the wrap finger passes the needle in order to insure the wrap yarn covering the full panel since it may have been last knit by the last needle of the wrap panel. At the first wrap position the trailing finger is the one which passes the needle row, the leading finger being carried along by the action of the disc 93. The yield cam 266 prevents the finger from jumping across the needle row due to impact with its projecting cam prior to the rise of the needle. All needles raised for wrap at the first wrap position are then lowered below the original level by the cam 677 after the wrap finger has been returned inside the needle row, but not necessarily to its inactive position, by a return cam. Cam 678 then levels off the sliders for selection by the cams 440. Needles raised by the cams 440 interlace the wrap yarn placed in the hooks of needles at the first position and are then wrapped by the leading finger. It can be readily understood that with the two yarns interlaced on the same panel of needles, the matter of drawing both yarns through to take up the slack at the end of the wrap horn is much more difficult than with a single yarn. With only one wrap position, only one wrap yarn would have to be controlled. This would slide easily through the interlaced needles and the timing or location of the end of the wrap horn could be placed so as to take out all the slack, the interlacing through the needles putting very little resistance on yarn drawn from the source of supply or on the yarn takeup. With two yarns interlaced on different needles in the same panel there is considerable resistance due to the wrap yarns' crossing and re-crossing each other several times in the same panel, due to selection at the two wrap position. Even in a narrow panel of five needles it may be that the yarns will cross each other four times; whereas, if only one yarn were used there would be very little interference to yarn movement through such a panel.

Another problem involved is that of protecting the wire 192 from the heel and toe pockets as they are being knit in reciprocation. A clearance 196 at the sinker knocking over position in run down direction is provided to assist in getting the puckered courses of the pockets under the lower portion of 188. It was also found necessary to have the outer edges of all angles of the plating cam and wrap horn to contact these puckered courses first thereby presenting a "camming in" effect to the fabric. The rounded face at 195 above the outer lower edge of the sloping plating cam end 194 provides both a clearance for the wrap yarns around the wire 192 and protection for the wire from the puckered fabric during reciprocation. Also, there must be enough clearance to knit loops without stripping all the supply through the panel again with the drag incurred. The wire 192 in the end of the wrap horn solves this problem nicely and at the same time leaves no surplus yarn across the back or inside of the wrapped panel. This wire sits relatively to the inside of the needles and as the wrap yarns hit the front angle 194 of the plating cam the excess yarn is drawn through the interlaced needles except for that portion from the last needle in the previous course to the first needle of the panel wrapped while the wire is still holding the yarn. As this passes off the wire the yarn then cams down and under the angle 194 of the plating cam. Since various wrap yarns and patterns require various adjustments of the plating cam and wire the bracket 246 is made adjustable both vertically and circumferentially through the medium of the screws 248 and 252 and slots 250.

The details of operation of the wrap yarn carriers have already been described. Interruption of wrap patterning during the formation of heels and toes may be effected as described in my application Serial Number 68,114.

The details of knitting of heels and toes form no part of the present invention but may be briefly described, reference being made to the application of Robert H. Lawson and Paul W. Bristow, Serial Number 728,226, filed February 13, 1947, in which details of the knitting of heels and toes are fully set forth.

At the time knitting of a heel is to be started the upper transfer cam 666 is inserted to transfer to the lower cylinder sliders all of the needles in the sole section. This action is effected in the usual fashion. Of the radially movable cams of the set cooperating with sliders in the upper cylinder only cam 672 is now active, this cam being in a position to engage only long knitting butts of upper sliders while missing short knitting butts. The short knitting butts occur in those sliders which control instep knitting while the long butts occur in the heel section of these sliders. Accordingly, the instep sliders in the upper cylinder will follow a path above the stitch cam 660 while the long butt sliders will follow a path below the stitch cam 660.

In the case of the cams associated with the lower cylinder only cams 650 and 674 are active and these are active only to operate on long knitting butts of the lower sliders. The short knitting butt sliders form the instep section and the long knitting butt sliders and heel section. Cam 664 occupies the upper construction line position illustrated in Figure 15. During the knitting of the heel the short butt lower sliders follow a path at welt level, avoiding depression by the cams 650 and 652 so as to prevent stress on the stitches which the associated needles hold. The long butt lower sliders follow the usual reciprocatory paths undergoing picking in the usual fashion by the pickers 686 and 688 to produce narrowing. In alternate reciprocations they pass down the forward and reverse stitch cams to take a main yarn. The picked up sliders pass above the level of the center cam 654 beneath the bottom of the raised cam 664. Cam 658 is at this time raised to avoid depressing action on the movable walls which would tend to stress rib stitches carried by needles in the upper cylinder.

During widening the lowering picker is brought into operation, this involving temporary control of the lowering picker to hold it between the two levels of passage of the long butt lower sliders. This control of the lowering picker need not be described herein, being described in detail in the Lawson and Bristow application referred to above.

The knitting of the toe is essentially similar to the knitting of the heel and the brief description offered above will suffice for both.

What is claimed is:

1. A knitting machine comprising a needle cylinder, needles carried by said cylinder, means carrying a wrap yarn for presentation to needles, a wrap horn about which the wrap yarn is drawn during a wrapping operation, and means mounting said wrap horn for universal adjustment.

2. A knitting machine comprising superposed needle cylinders, needles carried by said cylinders, means carrying a wrap yarn for presentation to needles, a cylinder within one of said needle cylinders, a wrap horn carried by the last mentioned cylinder about which horn the wrap yarn is drawn during a wrapping operation, and means mounting the last mentioned cylinder for universal adjustment.

3. A knitting machine comprising a needle cylinder, needles carried by said cylinder, a plurality of means carrying wrap yarns for presentation to needles, means for effecting the selective wrapping by said wrap yarns of a plurality of needles of a single group in a single course so that at least one needle of the group wrapped by one of said wrap yarns is between a pair of needles of the group wrapped by another of said wrap yarns, and a wrap horn about which said wrap yarns are drawn during a wrapping operation, said horn terminating in a wire-like extension located in the region where needles draw loops.

4. A knitting machine comprising superposed needle cylinders, needles carried by said cylinders, a plurality of means carrying wrap yarns for presentation to needles, means for effecting the selective wrapping by said wrap yarns of a plurality of needles of a single group in a single course so that at least one needle of the group wrapped by one of said wrap yarns is between a pair of needles of the group wrapped by another of said wrap yarns, a cylinder within one of said needle cylinders, and a wrap horn carried by the last mentioned cylinder about which horn said wrap yarns are drawn during a wrapping operation, said horn terminating in a wire-like extension located in the region where needles draw loops.

5. A knitting machine comprising superposed needle cylinders, needles carried by said cylinders, a plurality of means carrying wrap yarns for presentation to needles, means for effecting the selective wrapping by said wrap yarns of a plurality of needles of a single group in a single course so that at least one needle of the group wrapped by one of said wrap yarns is between a pair of needles of the group wrapped by another of said wrap yarns, a cylinder within one of said needle cylinders, and a wrap horn carried by the last mentioned cylinder about which horn said wrap yarns are drawn during a wrapping operation.

6. A knitting machine comprising a needle cylinder, needles carried by the cylinder, means carrying a wrap yarn for presentation to needles, and a wrap horn about which the wrap yarn is drawn during a wrapping operation, said wrap horn having its lower surface contoured to provide a cam engageable with a pocket formed in a stocking knit by the machine.

PAUL W. BRISTOW.

REFERENCES CITED

The following references are of record in the file of this patent:

UNITED STATES PATENTS

| Number | Name | Date |
| --- | --- | --- |
| 2,025,913 | Taggart | Dec. 31, 1935 |
| 2,146,750 | Lawson et al. | Feb. 14, 1939 |
| 2,221,713 | McAdams | Nov. 12, 1940 |
| 2,225,829 | Grothey | Dec. 24, 1940 |
| 2,244,331 | Dickens | June 3, 1941 |
| 2,283,554 | Houseman | May 19, 1942 |
| 2,302,946 | Holmes | Nov. 24, 1942 |
| 2,464,126 | Fregeolle | Mar. 8, 1949 |

FOREIGN PATENTS

| Number | Country | Date |
| --- | --- | --- |
| 526,963 | Great Britain | Sept. 30, 1940 |